United States Patent [19]

Brodeur et al.

[11] Patent Number: 4,775,035

[45] Date of Patent: Oct. 4, 1988

[54] LOAD COMPENSATING TRUCK MOUNTED BRAKE SYSTEM

[76] Inventors: Rene H. Brodeur, 2108 Beechwood Ave., Wilmette, Ill. 60091; Boris S. Terlecky, 6422 MacArthur Dr., Woodridge, Ill. 60517; Gerald R. Misner, 420 S. Fourth St., Peotone, Ill. 60468

[21] Appl. No.: 918,599

[22] Filed: Oct. 10, 1986

Related U.S. Application Data

[63] Continuation of Ser. No. 653,830, Sep. 24, 1984, abandoned.

[51] Int. Cl.4 .............................................. B61H 13/26
[52] U.S. Cl. ...................................... 188/195; 188/52
[58] Field of Search ............... 188/195, 190, 197, 201, 188/202, 72.9, 52, 53, 54, 55; 92/34

[56] References Cited

U.S. PATENT DOCUMENTS

| | | | |
|---|---|---|---|
| 2,369,543 | 2/1945 | Diurson | 188/195 |
| 2,374,053 | 4/1945 | Tramblie | 188/195 |
| 2,815,092 | 12/1957 | Baselt | 188/52 |
| 3,286,798 | 11/1966 | Taylor et al. | 188/195 |
| 3,298,474 | 1/1967 | Roselius et al. | 188/52 |
| 3,319,532 | 5/1967 | Pridham | 92/34 |
| 3,335,825 | 8/1967 | Merscreau et al. | 188/195 |
| 3,454,140 | 7/1969 | Billeter | 188/202 |
| 3,602,343 | 8/1971 | Billeter | 188/202 |
| 3,669,224 | 6/1972 | Billeter | 188/202 |
| 4,312,428 | 1/1982 | Beacon | 188/52 |
| 4,374,552 | 2/1983 | Dayen | 188/72.9 |

*Primary Examiner*—John W. Caldwell, Sr.
*Assistant Examiner*—Alvin Oberley
*Attorney, Agent, or Firm*—Kinzer, Plyer, Dorn, McEachran & Jambor

[57] ABSTRACT

The present invention encompasses a truck mounted brake system for double axle wheel trucks with pneumatic means operable through multiple levers to move the brake beams relative to each other. The lever system includes a double acting slack adjuster responsive to load changes to vary the braking force. Different load weights on the bolster causes it to assume different vertical positions relative to the side frames and the slack adjuster to vary in length so that uniform pressure to the pneumatic means produces higher brake pressure to the wheels of fully loaded cars and lower brake pressures to partially loaded and unloaded cars.

23 Claims, 3 Drawing Sheets

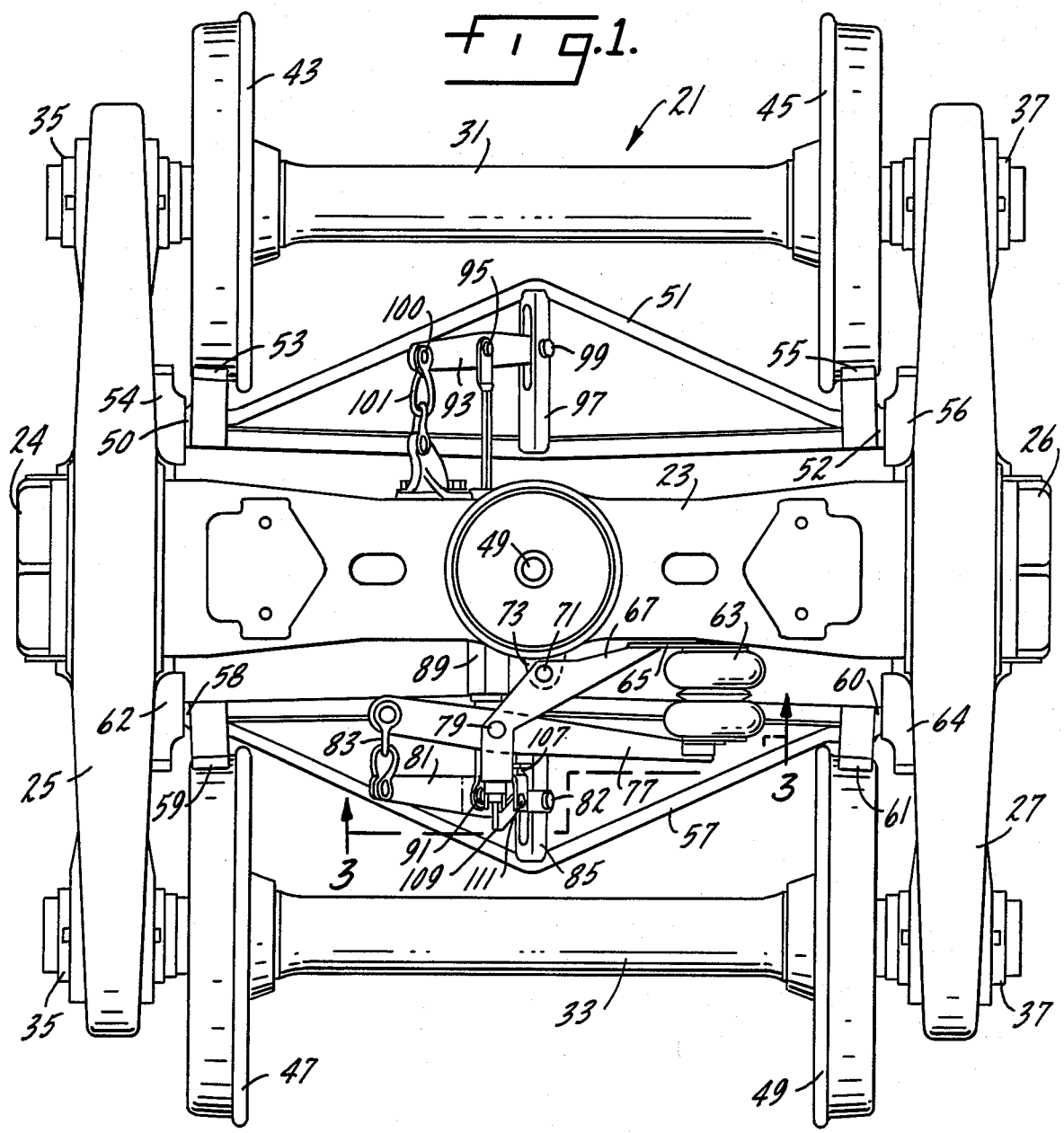
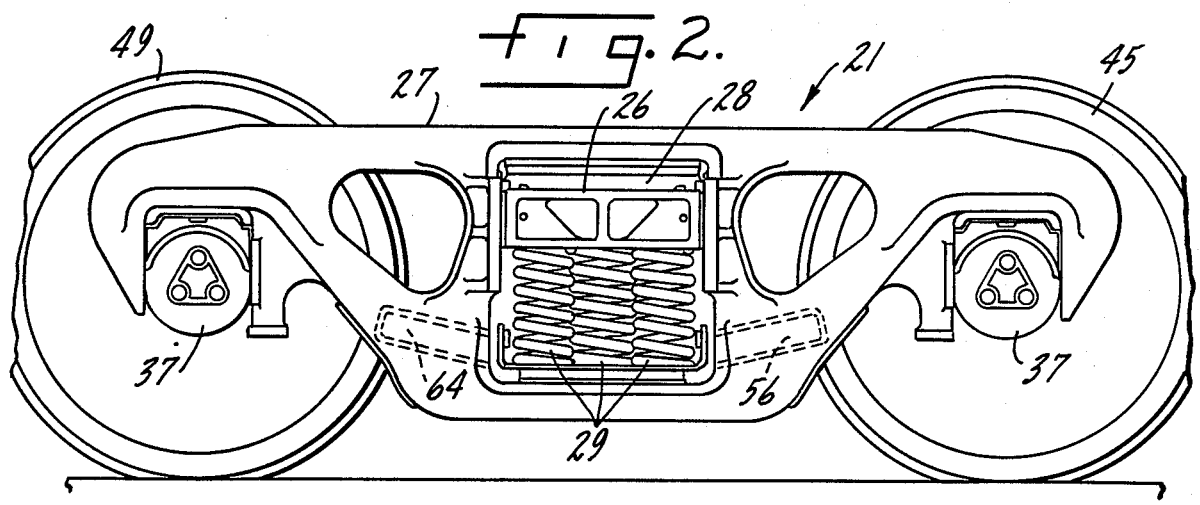

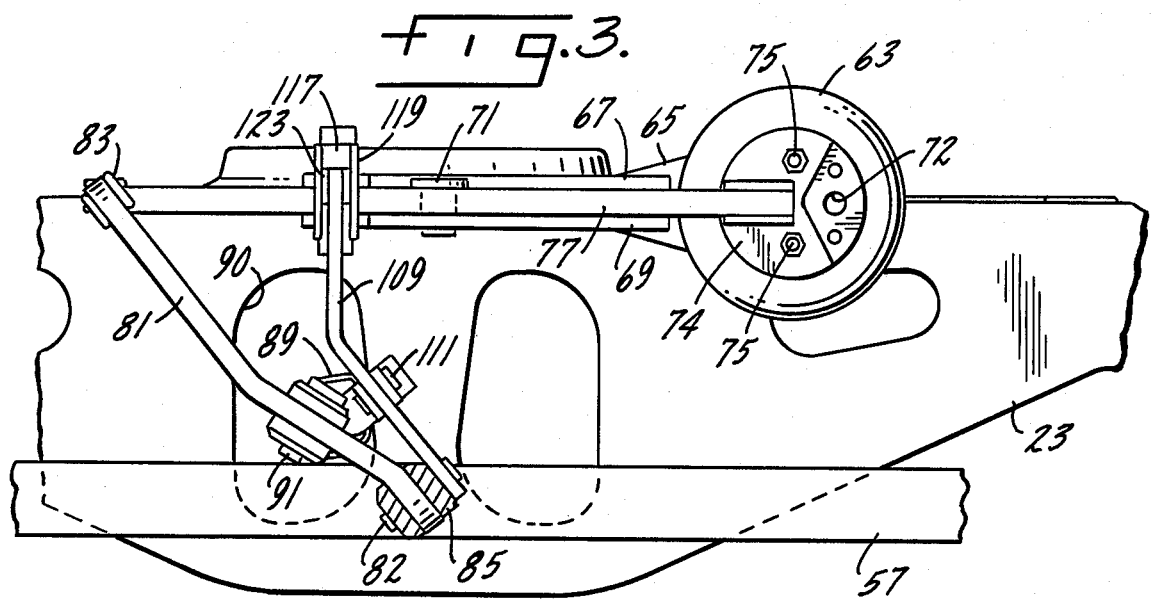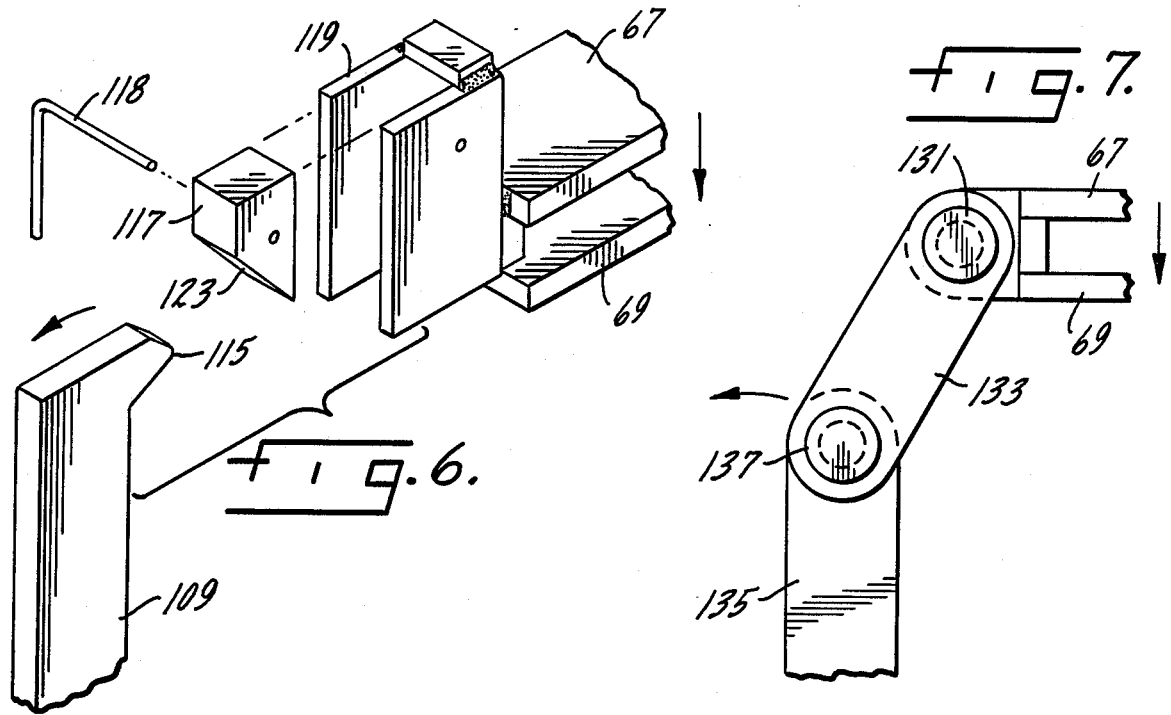

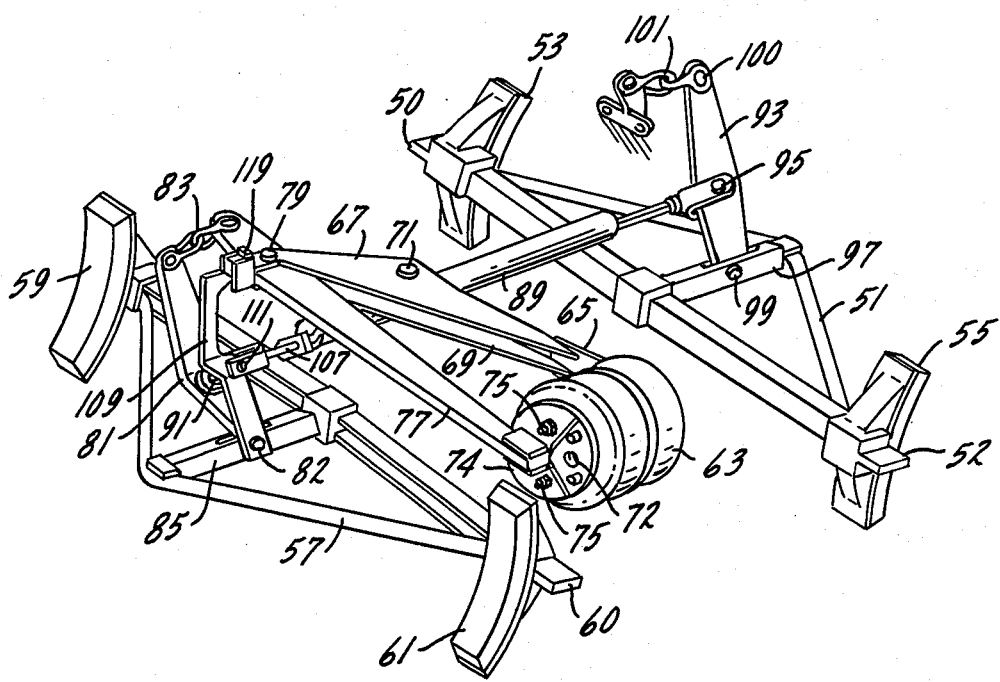

LOAD COMPENSATING TRUCK MOUNTED BRAKE SYSTEM

This is a continuation of application Ser. No. 06/653,830 filed Sept. 24, 1984, now abandoned.

BACKGROUND OF THE INVENTION

This invention relates to railroad car brake systems. More particularly, the invention relates to a wheel truck mounted brake system which is load sensitive and compensates for different weight loads on the truck.

Brake systems for double axle wheel trucks generally include brake shoes mounted on opposite ends of a pair of brake beams which are positioned between the axles, the beams being movable away from each other to press the shoes into engagement with the wheels. Customarily, these brake systems include a cylinder and piston for actuating the brake shoes into frictional engagement with the wheels. The cylinder and piston can either be mounted on the railroad car which the wheel truck supports, "car mounted", or can be mounted on the wheel truck, "truck mounted." In both cases, a multiple lever system interconnects the piston and the brake beams for operation of the brakes.

One of the problems arising in all railroad car brake systems is that the load imposed by the cars on their respective wheel trucks can vary considerably from car to car. Thus, in a single train, some cars may be fully loaded, some partially loaded, and some empty. Consequently, if uniform pressure is applied to the pneumatic means, i.e., the piston/cylinder, for the wheels of all the cars, the braking effect will be much higher on partially loaded and empty cars than on fully loaded cars and is undesirable.

The present invention is directed to a simple, light weight truck mounted brake system for wheel trucks which automatically compensates for different loads imposed on the trucks, and which provides for uniform braking for different loaded cars. The brake system of this invention uses standard truck components and brake beams, provides high braking efficiency, and includes automatic slack adjustment for brake shoe wear.

SUMMARY OF THE INVENTION

The present invention encompasses a truck mounted brake system for double axle wheel trucks which include a bolster resiliently supported upon a pair of side frames. The frames are mounted on a spaced pair of axles having wheels at each end. The brake system includes a pair of brake beams extending across the wheel truck adjacent respective ones of the axles with brake shoes at each end for engaging the wheels. Pneumatic means is supported on the bolster and is connected to the brake beams by a multiple lever system which is operable to move the beams relative to each other to press the brake shoes against the wheels upon pressurization of the pneumatic means. The lever system includes a double acting slack adjuster which is operable to increase and decrease in length to change the travel of the beams required for engagement of the shoes with the wheels, and actuator means responsive to the vertical position of the bolster relative to the side frames to change the length of the slack adjuster.

Different load weights on the bolster causes it to assume different vertical positions relative to the side frames and the slack adjuster to vary in length so that uniform pressure to the pneumatic means produces higher brake pressure to the wheels of fully loaded cars and lower brake pressures to partially loaded and unloaded cars. The result is to produce a uniform brake effect on all cars regardless of differences in load weight.

In a preferred form, a cam and follower movable relative to one another in response to relative vertical positioning between the bolster and side frames is operable to cause the actuator means to change the length of the slack adjuster. Preferably, the cam is supported by the bolster and the follower is attached to one of the brake beams and to the actuator means for the slack adjuster.

In another version, a pivoted link and lever is connected to the actuator means to cause the slack adjuster to change length in response to vertical positioning of the bolster relative to the side frames. In both forms, the slack adjuster is operable also to take up slack in the lever system as a result of wear of the brake shoes.

Preferably, the pneumatic actuating means includes an air bag which is adapted for mounting on the bolster and for connection to the lever system. Importantly, the brake system of this invention makes use of standard wheel truck and brake beam components without modification.

Overall, the brake system of this invention provides high braking efficiency while being light-weight and inexpensive.

BRIEF DESCRIPTION OF THE DRAWINGS

FIG. 1 is a top plan view of a double axle wheel truck incorporating the present invention;

FIG. 2 is a side elevational view of the structure of FIG. 1;

FIG. 3 is an enlarged sectional view of the structure of FIG. 1 taken along the line 3—3 thereof;

FIG. 4 is a perspective view of the structure of the brake system of this invention shown with the wheel truck structure removed for clarity;

FIG. 5 is an enlarged view of a portion of the structure of FIG. 4;

FIG. 6 is an enlarged exploded perspective view of a cam and follower structure which is a preferred form of this invention; and FIG. 7 is a partial view, corresponding to FIG. 6, showing a modified form of the invention.

DETAILED DESCRIPTION

Referring now more specifically to the drawings, a wheel truck incorporating the brake system of the present invention is shown generally at 21 in FIGS. 1 and 2 and is seen to include a rigid bolster 23 having a snubber 24, 26 at each end thereof extending through vertically elongated openings 28 in a pair of side frames 25, 27, respectively. A plurality of truck springs 29 are disposed in each opening 28 beneath the snubbers 24, 26 and resiliently support the bolster 23 for vertical movement relative thereto. The "normal" unloaded position of the bolster 23 is as shown in FIG. 2.

The side frames 25, 27 are each supported at opposite ends on a pair of spaced, parallel axles 31, 33 by wheel bearing assemblies 35, 37, and wheels 43, 45 and 47, 49 are mounted on axles 31, 33, respectively, near opposite ends thereof. In use, one of the wheel trucks 21 supports each end of a railroad car (not shown), with the car mounted on and secured to the bolster 23. A centering pin 49 on the bolster 23 locates the car body thereon, as will be understood by those skilled in the art.

In accordance with the invention, a brake assembly is provided for the wheel truck 21, which brake assembly includes a pair of brake beams extending across the wheel truck adjacent respective ones of the axles with brake shoes at each end for engaging the wheels. As embodied herein, a brake beam 51 extends across the wheel truck 21 between the bolster 23 and the axle 31 and is provided with a pair of brake shoes 53, 55 at opposite ends thereof positioned to confront and engage the wheels 43, 45, respectively. Brake beam 51 is provided with a pair of projections 50, 52 which are slidably received in tracks 54, 56 formed in side frames 25, 27 (see FIGS. 1 and 2) so that the beam 51 is supported on the frames 25, 27.

Another brake beam 57 extends across the truck 21 between the bolster 23 and axle 33 and has a pair of brake shoes 59, 61 positioned to confront and engage the wheels 47, 49, respectively. Brake beam 57 also has a pair of projections 58, 60 which slide in tracks 62, 64 in side frames 25, 27. When the brake beams 51, 57 are moved away from each other, as allowed by the slidable projections and tracks, the brake shoes 53, 55 and 59, 61 engage the wheels 43, 45 and 47, 49, respectively. When the beams 51, 57 are moved toward each other, the brake shoes are released from the wheels.

In accordance with the invention, pneumatic means is supported on the truck bolster and is operable under air pressure to cause the brake beams to move relative to each other and to press the brake shoes into engagement with the wheels. As embodied herein, an expandable air bag or bellows 63 has one end suitably fixed to a plate 65 rigid with a bracket formed by a pair of spaced, parallel plates 67, 69 (see FIGS. 4 and 5). The air bag 63 may be constructed as are those which are commercially available for use as air springs in tractor-trailers. A suitable air bag is a Firestone AIRSTROKE (registered trademark of Firestone Tire and Rubber Company) NO. 20 air mount, obtainable fom Firestone Industrial Products Co., Noblesville, Indiana. Such an air bag has been incorporated into a brake system embodying the present invention on a 70 ton four-wheel truck. The air bag has a minimum or unpressurized "design" height of 3 inches and an applied height for a loaded car of 6⅝ inches to 7⅜ inches, i.e., the length of the air bag upon brake application when the car is loaded. At the applied height, the air bag output force was 1,600 pounds, when charged to 50 psig. (pounds per square inch gauge).

Construction using air bags rather than conventional cast brake cylinders is considerably lighter in weight and easier to operate than conventional piston and cylinder devices which are conventionally cast iron. The bag 63 is provided with a fitting 72 adapted for connection to a compressed air source (not shown) so that the bag 63 may be expanded. The normal or "design" configuration of the bag 63 is as shown in FIGS. 1, 4 and 5.

The bracket plates 67, 69 preferably are welded to the plate 65 so that the assembly is rigid. Importantly, the bracket plates 67, 69 and air bag 63 are supported upon the bolster 23 by a pivot pin 71 which extends through the bracket plates 67, 69 and through a bracket 73 rigid with the bolster 23. The bracket eye 73 is a standard item on conventional bolsters and is cast integral therewith.

In accordance with the invention, a multiple lever system interconnects the pneumatic means and the brake beams and is operable to cause the brake beams to move relative to each other and the brake shoes to engage the wheels upon pressurization of the pneumatic means.

As embodied herein, the end of the air bag 63 opposite the plate 65 is connected to another plate 74 by bolts 75. The plate 74 is rigidly fixed to one end of an actuator lever 77 which is pivotally connected at an intermediate point to the bracket plates 67, 69 by a pin 79. The actuator lever 77 has its other end connected to one end of a live lever 81 by a short chain or link 83. The other end of lever 81 is pivoted by a pin 82 to a center brace 85 of brake beam 57. An intermediate point of the live lever 81 is pivoted to one end of a slack adjuster 89 by a pin 91. The slack adjuster 89 extends through an openings 90 in the bolster 23 and its other end is pivoted to an intermediate point of a dead lever 93 by a pivot pin 95. The slack adjuster 89 normally acts as a rigid link or lever but is selectively variable in length, as is explained below. The lower end of dead lever 93 is pivoted by a pin 99 to a center brace 97 of the brake beam 51. The upper end of the dead lever 93 is fixed by a pin 100 to a short chain or link 101 which is also fixed to the bolster 23.

In use, compressed air is admitted to the air bag 63 through fitting 72 causing the air bag to expand. It will be appreciated that the fitting 72 on air bag 63 is adapted for connection to the compressed air system of the railroad car (not shown) with which the wheel truck 21 is used. It will be understood by those skilled in the art that suitable controls will provide a means by which the compressed air supply of the train may be used to expand and contract the air bag 63 at will.

When compressed air is admitted to the air bag 63, it expands causing the actuator lever 77 to pivot about pin 79 in a clockwise direction, as seen in FIG. 1. Air bag 63 is free floating in that it is attached only to levers 67, 69, 77, but reaction forces in the lever system normally hold plate 65 against the side of bolster 23, as shown in FIG. 1. If desired, plate 65 could be fixed to the bolster in this position.

Clockwise pivotal movement of actuator lever 77 causes live lever 81 to follow the actuator lever 77 which, through the slack adjuster 89 which is placed in compression between live lever 81 and dead lever 93 and the dead lever 93 moves the brake beam 51 toward the axle 31 and the shoes 53, 55 into engagement with the wheels 43, 45. Continued pivotal movement of the actuating lever 77 after brake shoes 53, 55 engage wheels 43, 45 causes a reaction force through slack adjuster 89 and presses the brake shoes 59, 61 into engagement with the wheels 47, 49. When the compressed air to air bag 63 is released, it contracts to its design shape and the brake shoes 53, 55 and 59, 61 are released from the wheels.

In accordance with the invention, the lever system includes a double acting slack adjusted operable to increase and decrease in length to change the travel of the beams required for engagement of the shoes with the wheels. Actuator means responsive to the vertical position of the bolster relative to the side frames is operable to change the length of the slack adjuster.

As embodied herein and described above, the live lever 81 and the dead lever 93 are interconnected by slack adjuster 89. Normally, the slack adjuster 89 acts as a rigid compression link and transmits motion of the lever 81 directly to the lever 93. However, the slack adjuster 89 is, in addition, a double acting device which is operable to elongate and contract in length in response to external input. In accordance with the invention, such input derives from normal brake shoe wear and consequent brake shoe replacement and also from means which recognize the load condition upon the car body which, through adjustment of the rigid length of slack adjuster 89, adjusts the available braking force.

Actuator means including a trigger rod 107 is movable longitudinally relative to the adjuster 89 to release an internal holding mechanism such as a pawl (not shown) and allows an internal torsion spring mechanism (not shown) to turn a nut (not shown) which lengthens or shortens the slack adjuster. As will be understood by those skilled in the art, the "double acting" adjuster used herein has a double acting pawl and torsion spring assembly including a reversible nut, one pawl of which is released from the nut allowing one torsion spring to turn it in one direction to cause elongation, and the other pawl of which is released from the nut allowing another torsion spring to turn it in the other direction to cause contraction.

Examples of double acting slack adjusters are found, for example, in United States Patents issued to H. R. Billeter and assigned to Sloan Valve Company, Chicago, Illinois. Such examples are U.S. Pat. Nos. 3,454,140 issued July 8, 1969, 3,595,347 issued July 27, 1971, 3,602,343 issued Aug. 31, 1971, and 3,669,224 issued June 13, 1972.

A suitable double acting slack adjuster is Model No. 7100-6M manufactured by Ellcon-National of Totowa, New Jersey. In that device, movement of trigger rod 107 in an downward direction relative to the adjuster 87, as seen in FIG. 1 (in a left-hand direction as seen in FIG. 4), causes the adjuster 89 to elongate. Opposite directional movement of trigger rod 107 causes the adjuster to contract.

The trigger rod 107 is pivoted at one end to an intermediate point of a trigger lever 109 by a pivot pin 111. The lower end of the trigger lever 109 is pinned to the beam brace 85 and to live lever 81 by pin 82. The upper end of trigger lever 109 is formed with a cam follower 115 which is held in engagement with a wedge-shaped cam 117. The cam 117 is fixed by a locking pin 118 to a ramp box 119 suitably fixed as by welding to bracket plates 67, 69 (see FIG. 6).

The wedge-shaped block 117 has a downwardly tapering cam face 123 so that as the follower 115 moves downwardly relative to the block 117, the trigger lever 109 pivots in a clockwise direction, as seen in FIG. 4, about the pin 111. It will be appreciated that reaction forces on the trigger lever 109 cause the follower 115 to be pressed into engagement with the wedge block 117 when the brakes are actuated. This pivotal movement of the trigger lever 109 is transmitted into longitudinal movement of the trigger rod 107 which, in turn, affects the length of the slack adjuster 89 as described above.

Thus, as the bolster 23 moves downwardly relative to the side frames 25, 27, indicating a heavy load in the car (not shown) which is supported on the bolster 23, the cam block 117 also moves downwardly. Since the trigger lever 109 is pinned to the beam brace 85 and the beam 57 is slidably guided in tracks 62, 64 on side frames 25, 27, the lever 109 does not move with the bolster 23 and the cam surface 123 moves downwardly relative to follower 115 and pivots the trigger lever 109 in a counterclockwise direction, as seen in FIGS. 4 and 6. This causes the trigger rod 107 to move toward the left, as seen in FIG. 4, which results in lengthening of the slack adjuster 89. When pneumatic pressure is applied to the air bag 63, less travel (expansion) is required to apply the brake shoes to the wheels. Thus, the braking effect on the wheel trucks for a loaded car is increased.

When the bolster 23 moves upwardly relative to side frames 25, 27, indicating a lighter load in the car, the trigger lever 109 pivots in the opposite direction and the slack adjuster 89 is caused to shorten. Thus, a greater travel (expansion) of the air bag 63 is required to apply the brakes so that the braking effect on the wheel trucks for a partially loaded or empty car is less. As can be appreciated, variations of the slope of cam 117 varies the maximum pivotal action of the lever 109 resulting from contact of follower 115 upon the cam surface. In this way, the range of load, to no-load braking is varied. It is contemplated that the braking forces exerted by the brake shoes upon the wheels of a truck of an unloaded car should be 60% to 80% of the fully-loaded braking force. Any such desired range can be achieved through the above-mentioned alteration of the vertical slope of cam 117. Change of the maximum permissible pivotal range of movement of trigger lever 109 alters the permissible range of change of length of slack adjuster 89 due to load variations. This, in turn, changes the range of permissible variation of the stroke of the air bag 63 between load and no-load conditions and the resultant range of the change in applied braking force.

The dimensions and shape of the parts including the slope of the cam surface 123, the length of the trigger lever 109, and the position of the pivot pin 111 on the lever 109 are selected to proportion the amount of length adjustment of slack adjuster 89 to the change in load on the bolster 23 and to provide the desired adjustment in braking effect in accordance with load change. Thus, by this invention, the braking effect on each wheel truck is adjusted and controlled to compensate for variations in the load on that wheel truck so that the braking effect can be uniform on each of the trucks of a multiple car train.

In addition to adjusting the braking effect to compensate for load variations, the slack adjuster 89 also takes up slack in the lever system as the brake shoes wear. Thus, when pressure is applied to expand the air bag 63, the brake beams 51, 57 move away from each other until the brake shoes 53, 55 and 59, 61 engage the wheels. As the brake shoes wear, the travel of the beams 51, 57 increases and causes the trigger lever 109 to pull the trigger rod 107 toward the left, as seen in FIG. 4. As explained above, this produces a lengthening of the slack adjuster 89 which compensates for brake shoe wear.

As described above, the bolster 23 is of standard construction and has the air bag 63 and the multiple lever system supported thereon with no modifications to the bolster, using the provided bracket eye 73. Similarly, the brake beams 51, 57 are standard and require no modifications since the trigger lever 109 is attached to the beam brace 85 using the same pivot 82 as the live lever 81.

A modified form of slack adjuster length changing means is shown in FIG. 7. In this version, bracket plates 67, 69 are pivoted by a pin 131 to one end of a link 133. A trigger lever 135 is pivoted at one end by a pin 137 to the other end of link 133. The lower portion of trigger lever 135 is formed the same as trigger lever 109 and is connected to beam brace 85 and to trigger rod 107 in the same manner. Thus, as shown by the arrows in FIG. 7, vertical motion of the bracket plates 67, 69, indicating a load change on the bolster, produces the same pivotal action of trigger lever 135.

By the foregoing, there has been disclosed a load compensating brake system for railroad car wheel trucks calculated to fulfill the inventive objects set forth herein. It will be understood that various additions, substitutions, modifications and omissions may be made to the present invention without departing from the scope or spirit of the invention. For example, the cam block 117 could be made with a vertical cam surface. Thus follower 109 would not pivot in response to vertical movement of the bolster and braking force would remain constant regardless of car loading. This alternative could be advantageous in particular applications. Thus, it is intended and understood that those additions, substitutions, modifications and omissions are encompassed in the present invention provided they come within the scope of the appended claims and their equivalents.

What is claimed is:

1. A load compensating brake system for a wheel truck which includes a bolster resiliently supported on a pair of side frames, said frames being mounted on a spaced pair of axles having wheels at each end, said brake system including a pair of brake beams extending across the wheel truck adjacent respective ones of the axles with brake shoes at each end for engaging the wheels, and expandable pneumatic means supported on said bolster, a multiple lever system inter-connecting said expandable pneumatic means and said brake beams and operable to move said beams relative to each other to press said brake shoes against said wheels upon pressurization of said expandable pneumatic means, said lever system including a double acting slack adjuster having a trigger rod, the slack adjuster being operable under control of the trigger rod to increase and decrease in length to change the travel of said beams required for engagement of said shoes with said wheels, and actuator means responsive to the vertical position of said bolster relative to said side frames operable to change position of said slack adjuster trigger rod immediately upon a change in load on said bolster; wherein said multiple lever system includes:

a live lever having an end connected to one of said brake beams and an opposite end operatively connected to said expandable pneumatic means, a dead lever having an end connected to the other of said brake beams and an opposite end connected to said bolster, said double acting slack adjuster being connected at opposite ends thereof to said live lever and said dead lever intermediate the ends of said live and dead levers.

2. The brake system claimed in claim 1, said brake beams being located between said bolster and respective ones of said axles and being movable away from each other to cause said shoes to engage said wheels.

3. The brake system claimed in claim 1, said lever system including a pair of levers each connected at one end to a respective one of said brake beams, said slack adjuster connected at opposite ends to said levers.

4. The brake system claimed in claim 2, said lever system including a pair of levers each connected at one end to a respective one of said brake beams, said slack adjuster connected at opposite ends to said levers, whereby elongation of said slack adjuster decreases the travel of said beams required to cause engagement of said brake shoes with said wheels.

5. The brake system claimed in claim 3, including a trigger lever pivotable in response to vertical movement of said bolster relative to said frames to actuate said actuator means 6. The brake system claimed in claim 5, said actuator means including said trigger rod pivoted to said trigger lever and operable to cause a change in length in said slack adjuster.

7. The brake system claimed in claim 1, including cooperable cam and follower means interconnected with said bolster and said frames and operable, upon relative vertical movement of said bolster and frames, to actuate said actuator means.

8. The brake system claimed in claim 1, said brake beams being guidably supported on said side frames for movement toward and away from said axles.

9. The brake system claimed in claim 1 said pneumatic means including an expandable air bag fixed at one end to a bracket pivotably supported on said bolster.

10. The brake system claimed in claim 9, the other end of said air bag being connected to an actuating lever pivoted on said bracket.

11. The brake system claimed in claim 9, said air bag being connected at one end to a bracket pivotally supported on said bolster, and interengaging means connected to said bracket and one of said brake beams, respectively, operable, upon relative vertical movement of said bolster and frames, to actuate said actuator means.

12. The brake system claimed in claim 11, said interengaging means including a cam and follower.

13. The brake system claimed in claim 12, said cam being fixed to said bracket, said follower being pivoted to said brake beam and connected to said actuator means.

14. The brake system claimed in claim 11, said interengaging means including a pivoted link and lever.

15. The brake system claimed in claim 14, said link being pivoted to said bracket, said lever being pivoted to said brake beam and connected to said actuator means.

16. The brake system claimed in claim 7 wherein said cam defines a vertical surface and said follower, in contact therewith, retains said slack adjuster at a fixed length regardless of vertical position of said bolster relative to said side frames.

17. The load compensating brake system as claimed in claim 1 wherein said expandable pneumatic means is an expandable air bag.

18. The load compensating brake system as claimed in claim 1 wherein said system includes a bracket pivotally supported upon said bolster and supporting said expandable pneumatic means, said bracket defining a pivot, said connection between said live lever and said expandable pneumatic means includes a lever pivotally supported by said bracket at said point, said lever having an end connected to said live lever and an opposite end connected to said expandable pneumatic means.

19. The load compensating brake system as claimed in claim 18 wherein said expandable pneumatic means is an expandable air bag.

20. The load compensating brake system as claimed in claim 1 wherein said actuator means includes a cam supported upon said bracket, and a follower lever supported by the side frames in contact with said follower, said follower being connected to adjustment means on said slack adjuster to change the length thereof in response to change in load on said bolster.

21. The load compensating brake system as claimed in claim 20 wherein said expandable pneumatic means is an expandable air bag.

22. The load compensating brake system as claimed in claim 11 wherein said interengaging means includes a first lever connected to said bracket and a second lever supported by said side frame and pivotally connected to said first lever, said second lever being connected to adjustment means on said slack adjuster to change the length thereof in response to change in load on said bolster.

23. The load compensating brake system as claimed in claim 22 wherein said expandable pneumatic means is an expandable air bag.

* * * * *

UNITED STATES PATENT AND TRADEMARK OFFICE
CERTIFICATE OF CORRECTION

PATENT NO. : 4,775,035

DATED : Oct. 4, 1988

INVENTOR(S) : Rene H. Brodeur, et al.

It is certified that error appears in the above—identified patent and that said Letters Patent is hereby corrected as shown below:

On the title page Assignee should read:

[73]  Assignee:   Trailer Train Company,
                  Chicago, Illinois

Signed and Sealed this

Twenty-eighth Day of March, 1989

Attest:

DONALD J. QUIGG

Attesting Officer

Commissioner of Patents and Trademarks